(12) United States Patent
Kim et al.

(10) Patent No.: US 11,093,367 B2
(45) Date of Patent: Aug. 17, 2021

(54) METHOD AND SYSTEM FOR TESTING A SYSTEM UNDER DEVELOPMENT USING REAL TRANSACTION DATA

(71) Applicant: LG CNS Co., Ltd., Seoul (KR)

(72) Inventors: Yong Sik Kim, Seoul (KR); Jung Hwan Kim, Seoul (KR); Jin Ho Kim, Seoul (KR); Min Sung Shin, Seoul (KR); Hoil Lee, Seoul (KR); Kwang Ok Jang, Seoul (KR); Ki Chang Jung, Seoul (KR); Kang Hee Han, Seoul (KR)

(73) Assignee: LG CNS Co., Ltd., Seoul (KR)

(*) Notice: Subject to any disclaimer, the term of this patent is extended or adjusted under 35 U.S.C. 154(b) by 17 days.

(21) Appl. No.: 16/714,475

(22) Filed: Dec. 13, 2019

(65) Prior Publication Data

US 2020/0192786 A1 Jun. 18, 2020

(30) Foreign Application Priority Data

Dec. 14, 2018 (KR) .................. 10-2018-0162283

(51) Int. Cl.
*G06F 11/36* (2006.01)
*G06F 9/54* (2006.01)
*G06F 9/46* (2006.01)

(52) U.S. Cl.
CPC .......... *G06F 11/3636* (2013.01); *G06F 9/466* (2013.01); *G06F 9/546* (2013.01)

(58) Field of Classification Search
CPC ....... G06F 11/3636; G06F 9/466; G06F 9/546

USPC .................................................. 717/124–140
See application file for complete search history.

(56) References Cited

U.S. PATENT DOCUMENTS

| | | | | |
|---|---|---|---|---|
| 4,803,683 A * | 2/1989 | Mori | ....................... | G06F 11/22 714/31 |
| 5,940,473 A * | 8/1999 | Lee | ......................... | H04M 3/26 379/10.01 |
| 5,949,999 A * | 9/1999 | Song | .................... | G06F 11/3664 717/127 |
| 6,112,085 A * | 8/2000 | Garner | ................ | H04W 12/062 455/428 |
| 6,353,896 B1 * | 3/2002 | Holzmann | .............. | G06F 8/436 714/38.1 |
| 6,505,364 B2 * | 1/2003 | Simmons | ............... | A61G 13/06 108/150 |

(Continued)

OTHER PUBLICATIONS

Krishnamurthy et al, "On the Estimation of Reliability of a Software System Using Reliabilities of its Components", IEEE, pp. 146-155 (Year: 1997).*

(Continued)

*Primary Examiner* — Anil Khatri

(57) ABSTRACT

A method for testing an IT system automatically, when it comes to testing based on real transaction data including: (a) obtaining a transaction message by capturing a network packet transmitted and received between a user system and a transaction processing system; (b) transmitting a request data included in the transaction message to the system under test; (c) receiving a response data from the system under test; and (d) comparing the response data received from the system under test and a response data included in the transaction message and determining success or failure, is provided.

18 Claims, 4 Drawing Sheets

(56) References Cited

U.S. PATENT DOCUMENTS

| | | | |
|---|---|---|---|
| 6,640,244 B1* | 10/2003 | Bowman-Amuah | G06F 9/466 707/999.01 |
| 6,671,874 B1* | 12/2003 | Passova | G06F 8/73 714/E11.218 |
| 6,701,514 B1* | 3/2004 | Haswell | G06F 11/3664 707/999.102 |
| 6,708,327 B1* | 3/2004 | Aliphas | H04L 67/06 717/125 |
| 7,016,800 B1* | 3/2006 | Nguyen | G06F 11/3664 702/108 |
| 7,930,597 B2* | 4/2011 | Chang | G06F 11/3636 714/39 |
| 7,958,497 B1* | 6/2011 | Lindo | A63F 13/497 717/128 |
| 8,185,910 B2* | 5/2012 | Swildens | G06F 11/3414 719/310 |
| 8,645,140 B2* | 2/2014 | Lobzakov | G10L 13/00 704/260 |
| 8,984,490 B1* | 3/2015 | Dahan | G06F 11/3608 717/127 |
| 8,997,061 B1* | 3/2015 | Davison | G06F 11/3688 717/130 |
| 9,164,878 B2* | 10/2015 | Kosuda | G06F 11/3676 |
| 9,575,873 B2* | 2/2017 | Jakobs | G06F 11/3672 |

OTHER PUBLICATIONS

Lague et al, "Experience Report Assessing the Benefits of Incorporating Function Clone Detection in a Development Process", IEEE, pp. 314-321 (Year: 1997).*

Balci, "Principles and Techniques of Simulation Validation, Verification, and Testing", ACM, pp. 147-154 (Year: 1995).*

Chen et al, "Autonomous Vehicle Testing and Validation Platform: Integrated Simulation System with Hardware in the Loop", IEEE, pp. 949-956 (Year: 2018).*

Marijan et al, "On the Effectiveness of the System Validation Based on the Black Box Testing Methodology", IEEE, pp. 1-4 (Year: 2009).*

Fleurey et al, "Validation in Model-Driven Engineering: Testing Model Transformations", IEEE, pp. 29-40 (Year: 2004).*

Li et al, "Modeling for Image Processing System Validation, Verification and Testing", ACM, pp. 1-4 (Year: 2005).*

* cited by examiner

METHOD AND SYSTEM FOR TESTING A SYSTEM UNDER DEVELOPMENT USING REAL TRANSACTION DATA

BACKGROUND

Embodiments of the present disclosure relate to a method and a system for testing an information technology (IT) system, and, more specifically, to a method and a system for testing a system under development (SUD) using scenarios or cases that are actually occurring in real environment.

In general, when developing an IT system, separate testing procedures are carried out to confirm whether the IT system has defects or disorders.

However, the conventional techniques for testing an SUD have several disadvantages. A developer or designer has to manually create test cases using random or artificial data or a small amount of real data. Therefore, a limited test is performed, or even when a large amount of real data is used, a number of additional conversion programs have to be developed.

Also, when performing an integrated test, a plurality of business and IT people have to gather around to manually perform mutual testing, and accordingly, in order to guarantee the quality of the SUD through testing, a relatively large amount of time and cost are required. However, the manpower capable of performing the testing is very limited.

Therefore, demands for developing a technique for testing an SUD capable of proactive care for a massive amount of cases likely occurring in real environment by using transaction data of real users as test data while using a large number of real users as testers of the SUD are gradually on an increase, and means for solving the above drawbacks is urgently needed.

BRIEF SUMMARY

Embodiments of the present disclosure aim at solving the above-mentioned drawbacks of the prior art, and objects of the present disclosure are to solve a problem of manpower mobilization required for the testing and to save a time required for the testing, by carrying out a large volume of automated testing for a certain period using a scenario or case actually occurring in real environment.

The objects of the present disclosure are not limited to the above-mentioned objects, and other objects not mentioned will be clearly understood from the following description.

In order to achieve the above objects, according to an embodiment of the present invention, a method for testing an IT system automatically, when it comes to testing based on real transaction data, comprising: (a) obtaining a transaction message by capturing a network packet transmitted and received between a user system and a transaction processing system; (b) transmitting a request data included in the transaction message to the system under test; (c) receiving a response data from the system under test; and (d) comparing the response data received from the system under test and a response data included in the transaction message and determining success or failure, is provided.

Step (a) may comprise: obtaining, in case the network packet is encrypted, the transaction message by including information for decryption as variable data.

The transaction message may comprise a request data and a response data corresponding to the request data, and may be created in a flow unit.

Step (a) may comprise: granting UUID, which is a unique identifier, to the transaction message, in order to secure convenience in tracking.

Step (b) may comprise: converting a request data included in the transaction message into a structure or format defined by the system under test according to the conversion rule of the validation system and transmitting the same to the system under test.

Step (d) may comprise: mapping the comparison determination result and the response data received from the system under test with the transaction message and storing the same.

Step (d) may comprise: analyzing cause of error in case of being determined as a failure result as a result of the comparison and determination, and mapping the analyzed error information with the transaction message and storing the same.

Step (d) may carry out mapping and storing based on a predefined mapping rule in the test system.

Step (d) may comprise: extracting session ID and processing ID from the response data received from the system under test according to a predefined rule and registering the same to use the information as mapping information for later transaction messages.

Meanwhile, according to another embodiment of the present invention, a system for testing, comprising: a capture unit for obtaining a transaction message by capturing a network packet transmitted and received between a user system and a transaction processing system; a converting unit for transmitting a request data included in the transaction message to a system under test; and a result processing unit for comparing the response data received from the system under test and a response data included in the transaction message and determining success or failure, is provided.

The capture unit may obtain the transaction message by including information for decryption as variable data in case the network packet is encrypted.

The transaction message may comprise a request data and a response data corresponding to the request data, and may be created in flow unit.

The capture unit may grant UUID, which is a unique identifier, to the transaction message, in order to secure convenience in tracking.

The converting unit may convert a request data included in the transaction message into a structure or format defined by the system under test according to the conversion rule of the validation system and transmit the same to the system under test.

The result processing unit may map the comparison determination result and the response data received from the system under test with the transaction message and store the same.

The result processing unit may analyze cause of error in case of being determined as a failure result as a result of the comparison and determination, and map the analyzed error information with the transaction message and store the same.

The result processing unit may carry out mapping and storing based on a predefined mapping rule in the test system.

The result processing unit may extract session ID and processing ID from the response data received from the system under test according to a predefined rule and register the same to use the information as mapping information for later transaction messages.

The system may further comprise: a recording unit for storing the transaction message; a replaying unit for encoding the transaction message stored in the recording unit and transmitting the same to the converting unit; and a management unit for managing the operation condition of the capture unit, the recording unit, the replaying unit, the converting unit and the result processing unit.

According to an embodiment of the present disclosure, there is an effect of virtual system go-live in advance, while an actual user does not recognize he or she is using a system under development, by processing real transactions continuously and repeatedly through the use of transaction data of actual operation environment, not by a limited testing defined by a developer, thereby improving the quality of the system under development at an actual time of go-live.

According to another embodiment of the present disclosure, automated testing is performed using a large volume of transaction data of various cases occurring in real environment, thereby saving a time, costs, and manpower required for the testing as compared with the prior art in which mutual testing is performed on a system that has been developed.

The effects of the embodiments of the present disclosure are not limited to the above-mentioned effects, and it should be understood that the effects of the present disclosure include all effects that could be inferred from the configuration of the invention described in the detailed description of the invention or the appended claims.

DETAILED DESCRIPTION

Figure 1:
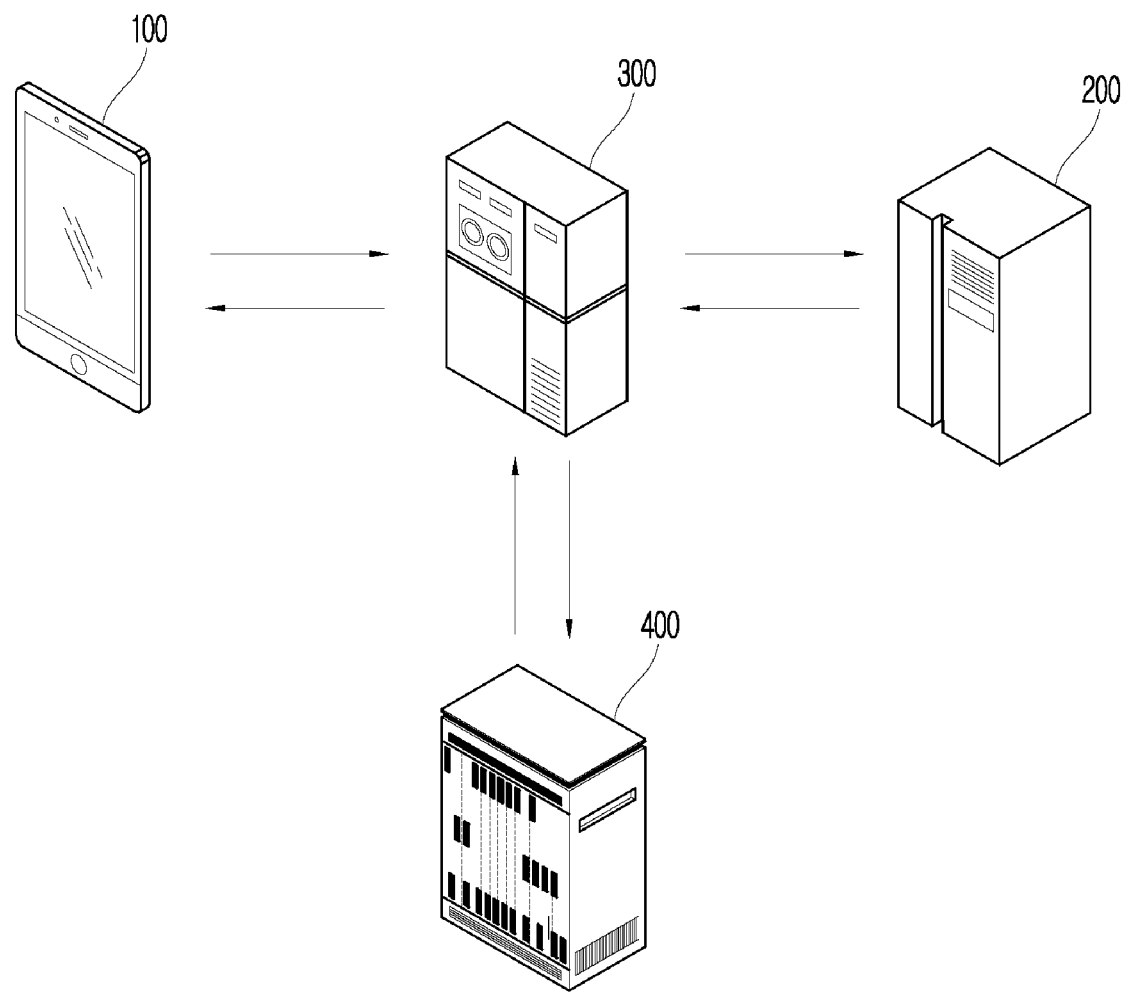
FIG. 1 illustrates a system for automatically testing an IT system according to an embodiment of the present disclosure.

Hereinafter, embodiments of the present disclosure will be explained with reference to the accompanying drawings. The invention, however, may be implemented in various different ways or forms, and should not be construed as limited to the embodiments set forth herein. Also, in order to clearly explain the embodiments of the present disclosure, portions that are not related to the invention are omitted, and like reference numerals are used to refer to like elements throughout.

Throughout the specification, it will be understood that when a portion is referred to as being "connected" to another portion, it can be "directly connected to" the other portion, or "indirectly connected to" the other portion having intervening portions present. Also, when a component "includes" an element, unless there is another opposite description thereto, it should be understood that the component does not exclude another element but may further include another element.

FIG. 1 illustrates a system for automatically testing an IT system based on real transaction data according to an embodiment of the present disclosure. Hereinafter, the system for automatically testing the IT system will be referred to as an "automated testing system," and the IT system under the test will be referred to as a "system under development (SUD)."

Referring to FIG. 1, the automated testing system may include a user system 100, a transaction processing system 200, a validation system 300, and an SUD 400.

The user system 100, the transaction processing system 200, the validation system 300, and the SUD 400 may be connected to each other through a communication network. Here, the communication network may be configured without regard to its communication type such as wired or wireless, and may be configured as any of various communication networks including a local area network (LAN), a metropolitan area network (MAN), a wide area network (WAN), etc.

The user system 100 may transmit first request data to the transaction processing system 200 corresponding to a work requested by a user. The first request data may be transmitted in the form of a text or binary and plain or encoded or encrypted format.

The transaction processing system 200 may generate first response data in response to the first request data and transmit the first response data to the user system 100, and may store the first request data and the first response data in the transaction processing system 200, accordingly.

The validation system 300 may obtain transaction packets by capturing network packets transmitted between the user system 100 and the transaction processing system 200.

In particular, the validation system 300 may obtain transaction data by capturing the network packets including the first request data and the first response data transmitted between the user system 100 and the transaction processing system 200.

The validation system 300 may create a transaction message by merging the first request data and the first response data as one message, and a universally unique identifier (UUID), which is a unique identifier, may be granted to the created transaction message to secure convenience in future tracking.

In other words, the transaction message may basically comprise the first request data and the first response data, and may be created in a flow unit. According to an embodiment of the present disclosure, in addition to the first request data and the first response data, the transaction message may include common header information such as source and destination IP addresses, TCP ports, a message protocol, a data length, etc. Also, in the transaction message, request data may be distinguished from response data according to the data length.

According to an embodiment of the present disclosure, in case the network packet includes encrypted information, the validation system 300 may create the transaction message by including, as variable data, information for decrypting the encrypted information.

The validation system 300 may decode the created transaction message in a flow unit and store the decoded transaction message in the validation system 300.

The validation system 300 may convert the first request data of the transaction message based on a predefined coversion rule. Here, the predefined conversion rule may be a rule defining a conversion method according to a difference in calling methods between the transaction processing system 200 and the SUD 400.

In particular, the validation system 300 may extract the first request data from the transaction message, decode the first request data, and then convert the decoded first request data to second request data according to the predefined conversion rule. When the conversion is completed, the validation system 300 may encode the second request data, transmit the encoded second request data to the SUD 400.

That is, the second request data may be a conversion of the first request data according to the predefined conversion rule of the validation system 300, and the first request data is converted into a structure or format defined by the SUD 400. Like the first request data, the second request data may be transmitted in the form of a text or binary and plain or encoded or encrypted format.

On the other hand, if there is no difference in the calling methods between the transaction processing system 200 and the SUD 400, the validation system 300 may transmit the first request data to the SUD 400 without converting the first request data.

After that, the validation system 300 may receive second response data for the second request data from the SUD 400, map the second response data with the first response data included in the transaction message, and store a result of the mapping.

Also, the mapping and the storing may be carried out based on a rule predefined in the validation system 300.

The validation system 300 may analyze the second response data received from the SUD 400, compare the analysis result with the first response data received in advance, and determine whether the test is successful or failed.

According to the embodiment of the present disclosure, as a result of analyzing the second response data and comparing the analysis result with the first response data, when it is determined that the testing is failed, the validation system 300 may store error information. In this case, the validation system 300 may map the failure result and the error information with the transaction message and store the mapping result based on a predefined mapping rule.

Also, the validation system 300 may extract specific information such as a session ID, a processing ID, etc. from the second response data according to a predefined rule and register the specific information to thereby use the specific information as mapping information for later transaction messages.

The SUD 400 may receive the second request data converted according to the predefined conversion rule from the validation system 300, generate the second response data in response to the second request data, and transmit the second response data to the validation system 300.

Figure 2:
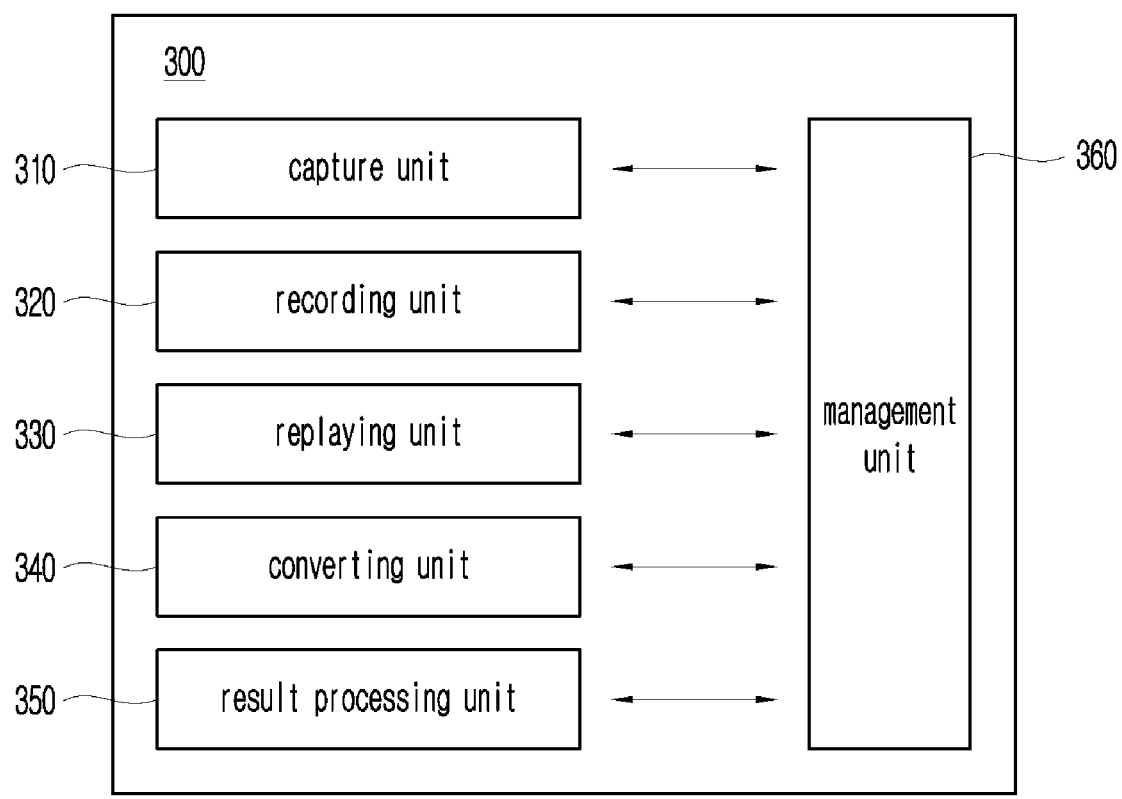
FIG. 2 illustrates a validation system according to an embodiment of the present disclosure.

FIG. 2 illustrates the validation system 300 of FIG. 1 according to an embodiment of the present disclosure.

Referring to FIG. 2, the validation system 300 may include a capture unit 310, a recording unit 320, a replaying unit 330, a converting unit 340, a result processing unit 350, and a management unit 360.

In an embodiment, the capture unit 310, the replaying unit 330, the converting unit 340, the result processing unit 350, and the management unit 360 may be implemented using one or more processes performed by one or more processors. The recording unit 320 may be implemented using a storage element such as a hard disc, a memory, or the like.

The validation system 300 of FIG. 2 will be described with reference to the automated testing system shown in FIG. 1.

The capture unit 310 may obtain transaction packets by capturing network packets transmitted between the user system 100 and the transaction processing system 200.

In particular, the capture unit 310 may obtain transaction data by capturing the network packets including the first request data and the first response data transmitted between the user system 100 and the transaction processing system 200. Therefore, the first request data and the first response data may be included in the transaction data.

The capture unit 310 may create a transaction message by merging the first request data and the first response data as one message, and may grant a UUID, which is a unique identifier, to the created transaction message. Here, the transaction message may be created in a flow unit.

According to an embodiment of the present disclosure, in case the captured network packet is encrypted, the capture unit 310 may further add information for decrypting the network packet, as variable data, to the transaction message.

In other words, the capture unit 310 may obtain the first request data and the first response data transmitted between the user system 100 and the transaction processing system 200 by capturing the network packets, and create the transaction message by merging the first request data and the first response data as one message. In this case, in addition to the first request data and the first response data, the transaction message may further include common header information such as source and destination IP addresses, TCP ports, a message protocol, a data length, etc., and the variable data including the information for decrypting encrypted data.

The recording unit 320 may decode the transaction message created by the capture unit 310 in a transaction unit and store the decoded transaction message. Location information of each of the stored transaction message may be stored separately as index information having a fixed size.

When storing the decoded transaction message, the recording unit 320 carries out permanent storing, not temporary storing, so that the transaction message may be reproduced later by a real-time method or a batch method. In an embodiment, the decoded transaction message may be stored in a physical disc file.

The replaying unit 330 may encode the decoded transaction message stored in the recording unit 320 and transmit the encoded transaction message to the converting unit 340. Location information of the transmitted transaction message may be stored separately.

According to an embodiment of the present disclosure, in case a start index and an end index of the transaction messages recorded in the recording unit 320 are specified, the replaying unit 330 may encode and transmit only parts of the transaction messages to the converting unit 340. The parts of the transaction messages may refer to the transaction messages ranging from the start index to the end index.

The converting unit 340 may convert the first request data included in the transaction message into the second request data and transmit the second request data to the SUD 400. The second request data may be data converted into a structure or format defined by the SUD 400 according to the predefined conversion rule of the validation system 300.

Specifically, the converting unit 340 may carry out a pre-processing work for conversion according to protocols used by the transaction processing system 200 and the SUD 400, such as HTML (Hyper Text Markup Language), XML (Extensible Markup Language), JSON (JavaScript Object Notation), proprietary TCP (Transmission Control Protocol) message, etc. The pre-processing work may include decoding, converting a character set, extractings session and cookie information, etc. that are performed based on the first request data and the first response data of the transaction message.

According to an embodiment of the present disclosure, in case the first request data is encrypted, the converting unit 340 may additionally carry out a process of decrypting the first request data according to an encryption method.

Upon completing the pre-processing work for the first request data, the converting unit 340 may convert the first request data into the second request data according to the predefined conversion rule.

The predefined conversion rule is a definition of the mapping rule between the transaction processing system 200 and the SUD 400. The management unit 360 manages the predefined conversion rule. Accordingly, the first request data may be converted into the second request data conforming to the protocol of the SUD 400.

Also, the converting unit 340 may mask or encode part of the second request data and transmit the encoded second request data to SUD 400.

The result processing unit 350 may receive the second response data for the second request data from the SUD 400, and analyze the received second response data.

The result processing unit 350 may compare the first response data, which has been received and stored in advance, with the second response data through the analysis, and determine whether the test is successful or failed based on the comparison result.

Also, the result processing unit 350 may map the comparison and determination results and the second response data with the transaction message received in advance and store the mapping result. As a result of comparing and determining, in case of being determined that the testing is failed, error information on the test failure may be mapped with the transaction message and stored.

Here, the mapping and storing may be carried out based on a predefined mapping rule.

Also, the result processing unit 350 may analyze the second response data according to a predefined rule in order to extract specific information such as a session ID and a processing ID from the second response data, and store the specific information to thereby use the specific information as mapping information for subsequent transaction messages.

According to an embodiment of the present disclosure, the result processing unit 350 may map and store session information of each of the transaction processing system 200 and the SUD 400 so as to maintain a session of the transaction processing system 200 and the SUD 400, and update the session information based on the mapping result.

In other words, the result processing unit 350 may map session information of the transaction message including the first request data processed by the transaction processing system 200 and session information of a transaction performed by the SUD 400 based on the second request data, and store the mapping result. Also, the result processing unit 350 may correlate and store the session information included in the first response data of the transaction processing system 200 and the session information included in the second response data of the SUD 400. The process of mapping the session information may be performed based on a mapping rule predefined by the management unit 360.

Also, according to an embodiment of the present disclosure, the result processing unit 350 analyzes the second response data received from the SUD 400, and in case a key value of a work newly created is present in the second response data, the key value may be mapped with a key value for the transaction data of the transaction processing system 200 that is included in the transaction message, and stored.

Also, according to an embodiment of the present disclosure, the result processing unit 350 correlates and store the key values included in the first and second response data of the transaction processing system 200 and the SUD 400. In other words, the result processing unit 350 may map the key value for the transaction data including the first request data (or the first response data) received from the transaction processing system 200 with the key value for the transaction data including the second request data (or the second response data) received from the SUD 400 and store the mapping result. Likewise, the process of mapping the variable data may be performed based on a mapping rule predefined by the management unit 360 and stored.

In this case, in order to map the key values, the result processing unit 350 may provide various search methods for finding a key value from the second response data received from the SUD 400, such as LEFT BOUND/RIGHT BOUND, JSON PATH, XPATH, etc.

Also, the result processing unit 350 may store log information and raw response data of the SUD 400 separately.

As a result, the result processing unit 350 may store and manage the overall performance results, statistics, detailed information on individual transaction messages, and error information, and provide corresponding information upon request of a manager.

The management unit 360 may predefine the mapping rule and the conversion rule, and may manage and control the operations of the capture unit 310, the recording unit 320, the replaying unit 330, the converting unit 340, and the result processing unit 350 and change their configuration items.

Figure 3:
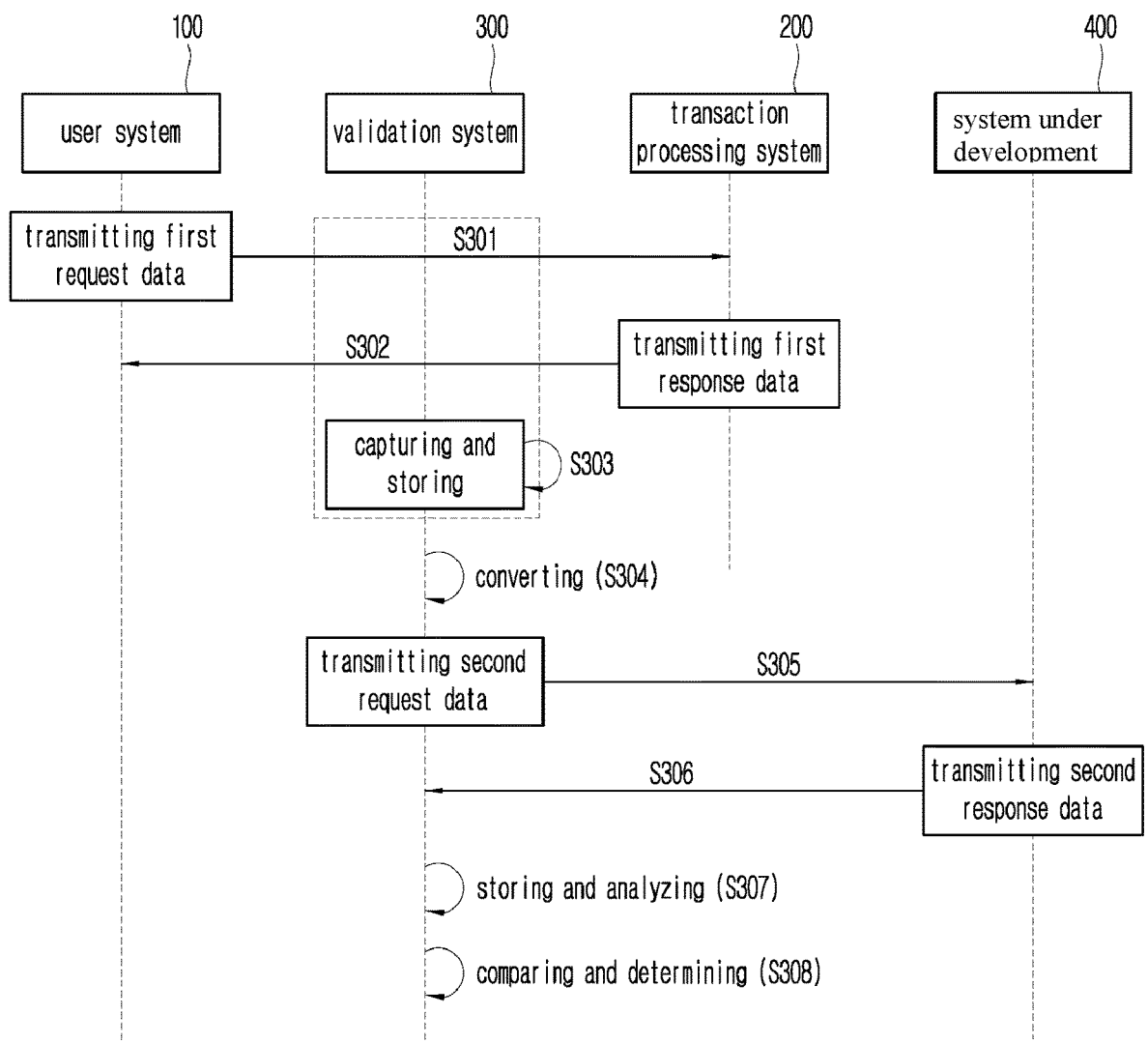
FIG. 3 is a flow chart illustrating a process of automated testing for an IT system according to an embodiment of the present disclosure.

FIG. 3 is a flow chart illustrating automated testing for an SUD based on real transaction data according to an embodiment of the present disclosure. The automated testing of FIG. 3 will be described with reference to the automated testing system shown in FIG. 1.

First, upon receiving first request data for a work from the user system 100 (S301), the transaction processing system 200 may transmit first response data corresponding to the first request data to the user system 100 (S302). Transmitting and receiving the first request data and the first response data may mean one transaction.

The validation system 300 may obtain a transaction message by capturing network packets including the first request data and the first response data, which are transaction data transmitted between the user system 100 and the transaction processing system 200 when a transaction occurs between the user system 100 and the transaction processing system 200 (S303). That is, the transaction message may include the first request data and the first response data, and may be created in a flow unit.

In particular, the validation system 300 may merge the first request data and the first response data into one transaction message and store the transaction message in a transaction unit. By assigning or granting a UUID, which is a unique identifier, to the transaction message, the transaction message can be tracked using the UUID, thereby providing convenience to the tracking.

According to an embodiment of the present disclosure, in case the captured network packet is encrypted, the validation system 300 may create the transaction message by including, as variable data, information for decrypting the network packet.

Also, the validation system 300 may permanently store the transaction message in the validation system 300.

The validation system 300 may decode the first request data and convert the decoded first request data into second request data according to a predefined conversion rule (S304).

In other words, as the predefined conversion rule defines how to map the transaction processing system 200 and the SUD 400, the conversion includes converting the first request data for a protocol used in the transaction processing system 200 to the second request data for a protocol used in the SUD 400, and accordingly, the second request data may be converted into a request structure or format defined by the SUD 400.

According to an embodiment of the present disclosure, in case the first request data of the transaction message is encrypted, the validation system 300 may perform decryption on the first request data according to an encryption method, and then convert the decrypted first request data into the second request data according to the predefined conversion rule.

Upon completion of the conversion, the validation system 300 may transmit the second request data to the SUD 400 (S305), and receive second response data for the second request data from the SUD 400 (S306).

Then, the validation system 300 may store and analyze the received second response data (S307).

In particular, upon receiving the second response data from the SUD 400, the validation system 300 may map the second response data with the first response data included in the transaction message received from the transaction processing system 200 and store the mapping result. In this case, the mapping may be carried out based on a predefined mapping rule.

The validation system 300 may compare the second response data with the first response data based on the analysis result and determine whether the test is successful or failed (S308).

When the testing is determined as failed, the validation system 300 may further analyze error information corresponding to a cause of the test failure and store the analysis result. The error information may also be mapped with the transaction message based on a predefined mapping rule and stored.

The validation system 300 may additionally perform a process of extracting specific information such as a session ID, a processing ID, etc. from the second response data according to a predefined rule in order to use the specific information as mapping information for subsequent transaction messages.

Also, as all the mapped information is classified according to the UUID granted to the transaction message and stored in the validation system 300, it is easier to track or search data in the future, and it is possible to manage tested data. Also, as all the transaction messages are tagged with UUIDs in the validation system 300, the transaction messages themselves are also easily tracked or traced later on.

Figure 4:
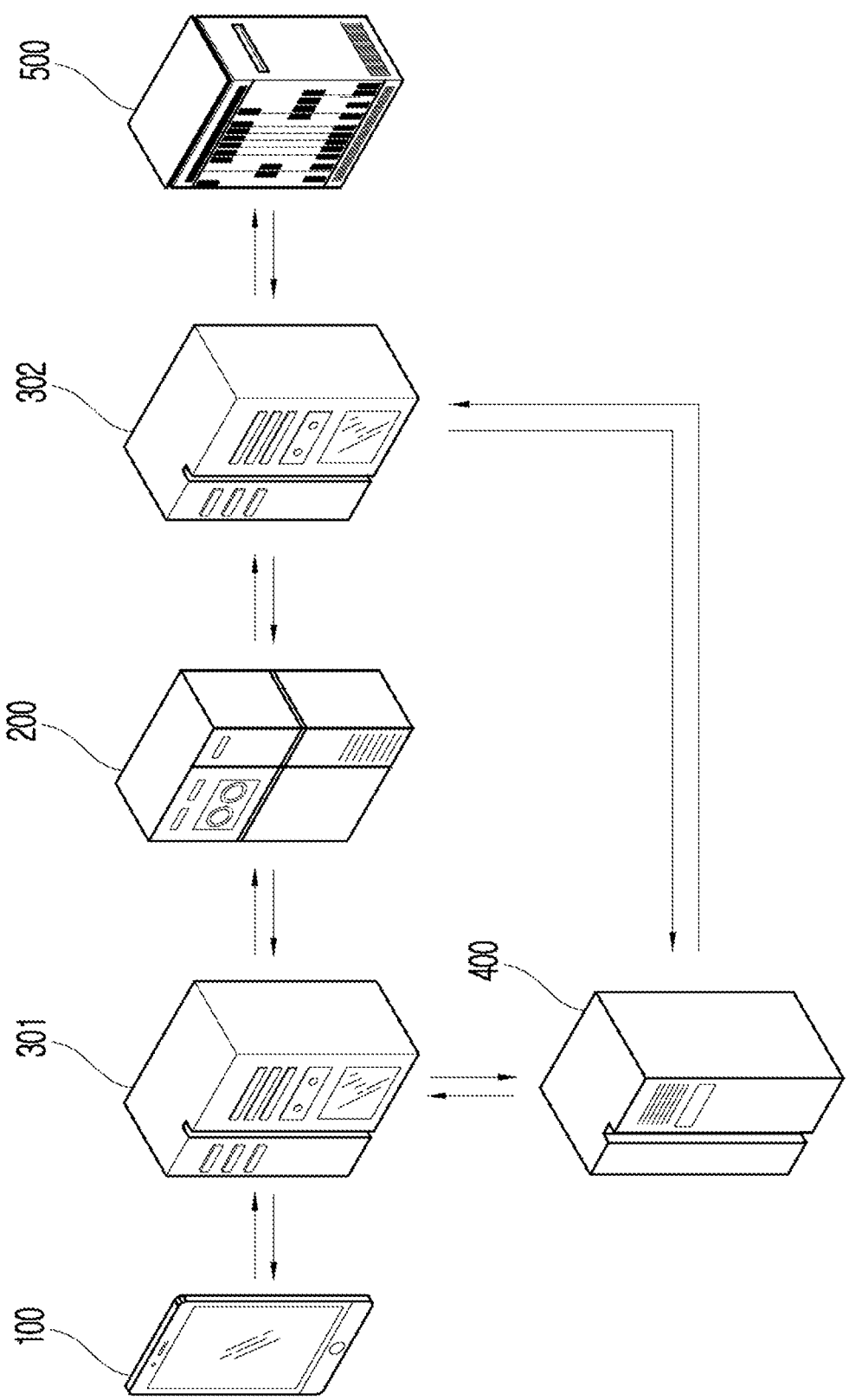
FIG. 4 illustrates a system for automatically testing an IT system according to another embodiment of the present disclosure.

FIG. 4 illustrates a system for automatically testing an IT system based on real transaction data according to another embodiment of the present disclosure.

Referring to FIG. 4, the automated testing system may include a user system 100, a transaction processing system 200, a first validation system 301, a second validation system 302, a SUD 400 under test, and an external system 500.

The user system 100, the transaction processing system 200, the first validation system 301, the second validation system 302, the SUD 400, and the external system 500 may be connected to each other through a communication network. Here, the communication network may be configured without regard to its communication type such as wired or wireless, and may be configured as any of various communication networks including a local area network (LAN), a metropolitan area network (MAN), a wide area network (WAN), etc.

In particular, compared to the automated testing system shown in FIG. 1, in the automated testing system shown in FIG. 4, the transaction processing system 200 is connected with the external system 500. As a transaction is carried out by transmitting and receiving first request data and first response data between the user system 100 and the transaction processing system 200 upon request of the user system 100, the first validation system 301 creates a transaction message by capturing network packets including the first request data and the first response data, converts the first request data of the created transaction message into the second request data according to a predefined conversion rule, transmits the second request data to the SUD 400, receives second response data for the second request data from the SUD 400, and compares the first response data and the second response data to determine whether the test is successful or failed. The operations of the first validation system 301 are substantially the same as those of the validation system 300 in FIG. 1.

Meanwhile, in case the transaction processing system 200 is connected with the external system 500, a plurality of validation systems, e.g., the first and second validation systems 301 and 302, exist so that the network packets on the transaction between the user system 100 and the transaction processing system 200 are captured by the first validation system 301, and network packets on a transaction between the transaction processing system 200 and the external system 500 are captured by the second validation system 302.

Accordingly, like the first validation system 301, the second validation system 302 may create a transaction message by capturing network packets including third request data and third response data transmitted and received between the transaction processing system 200 and the external system 500, and may convert the third request data of the created transaction message into fourth request data conforming to the protocol of the SUD 400 based on a predefined conversion rule.

Also, when the fourth request data is transmitted to the SUD 400, the second validation system 302 receives fourth response data for the fourth request data from the SUD 400, compares the prestored third response data to the fourth response data, and determines whether the test is successful or failed based on the comparison result.

Also, in case the SUD 400 cannot be directly connected with the external system 500, instead of the external system 500, the SUD 400 is integrated with the second validation system 302 to obtain real exchanged data stored in the second validation system 302.

As such, according to the embodiments of the present disclosure, the present invention has an effect of a virtual system go-live in advance, while an actual user does not recognize he or she is using the SUD, by processing real transactions continuously and repeatedly through the use of transaction data of the actual operation environment, not by using limited testing data defined by a developer, thereby improving the quality of the SUD at the actual time of go-live.

Also, according to the embodiments of the present disclosure, the present invention performs automated testing using a large volume of transaction data of various cases occurring in real environment, thereby being able to save a time, cost, and manpower required for testing as compared with the prior art in which mutual testing is performed after a system is developed.

The effects of the present invention are not limited to the above-mentioned effects, and it should be understood that the effects of the present invention include all effects that could be inferred from the embodiments of the invention described in the detailed description of the invention or the appended claims.

The foregoing description of the present invention has been presented for illustrative purposes, and it is apparent to a person having ordinary skill in the field that the present invention can be easily modified or adapted into different forms without changing the technical idea or essential features of the present invention. Therefore, it should be understood that the forgoing embodiments are by way of example only, and are not intended to limit the present disclosure. For example, each component which has been described as a unitary part can be implemented as distributed parts. Likewise, each component which has been described as distributed parts can also be implemented as a combined part.

The scope of the present invention is presented by the accompanying claims, and it should be understood that all changes or modifications derived from the definitions and scopes of the claims and their equivalents fall within the scope of the present invention.

What is claimed is:

1. A method of a validation system for testing a system under development (SUD) using real transaction data, the method comprising:
   capturing network packets transmitted through a first communication network between a user system and a transaction processing system,
   the network packets including first request data and first response data that are transmitted for a real transaction occurring between the user system and the transaction processing system;
   creating a transaction message by merging the first request data from the user system and the first response data from the transaction processing system,
   the first response data being generated by the transaction processing system in response to the first request data;
   storing the transaction message in a memory;
   converting the first request data into second request data conforming to a protocol used in the SUD according to a conversion rule of the validation system;
   transmitting the second request data to the SUD through a second communication network between the validation system and the SUD;
   receiving second response data from the SUD through the second communication network, the second response data being generated by the SUD in response to the second request data;
   comparing the second response data and the first response data; and
   determining whether a test is successful or failed based on a comparison result,
   wherein the method further comprises granting a universally unique identifier (UUID) to the transaction message.

2. The method of claim 1, further comprising obtaining the transaction message including information for decrypting the network packets when the network packets are encrypted.

3. The method of claim 1, wherein the transaction message is created in a flow unit.

4. The method of claim 1,
   wherein the second request data has a structure or format defined by the SUD.

5. The method of claim 1, further comprising:
   mapping the comparison and determination result and the second response data with the transaction message and storing a mapping result.

6. The method of claim 5, further comprising:
   analyzing a cause of an error occurring when the test is failed to generate error information; and
   mapping the error information with the transaction message and storing a mapping result.

7. The method of claim 5, wherein the mapping and storing are carried out based on a predefined mapping rule in the validation system.

8. The method of claim 1, further comprising:
   extracting a session ID and a processing ID from the second response data according to a predefined rule; and
   registering the session ID and the processing ID to be used as mapping information for subsequent transaction messages.

9. A system for testing an SUD using real transaction data, comprising:
   a memory; and
   one or more processors configured to:
   capture network packets transmitted through a first communication network between a user system and a transaction processing system,
   the network packets including first request data and first response data that are transmitted for a real transaction occurring between the user system and the transaction processing system;
   create a transaction message by merging the first request data from the user system and the first response data from the transaction processing system,
   the first response data being generated by the transaction processing system in response to the first request data;
   store the transaction message in the memory;
   convert the first request data into second request data conforming to a protocol used in the SUD according to a conversion rule, and
   transmit the second request data to the SUD through a second communication network between the system and the SUD;
   compare second response data received from the SUD and the first response data, the second response data being generated by the SUD in response to the second request data and transmitted to the system through the second communication network; and
   determine whether a test is successful or failed based on a comparison result,
   wherein the one or more processors are further configured to grant a UUID, which is a unique identifier, to the transaction message.

10. The system of claim 9, wherein the transaction message further comprises information for decrypting the network packets when the network packets are encrypted.

11. The system of claim 9, wherein the transaction message is created in a flow unit.

12. The system of claim 9, wherein the second request data has a structure or format defined by the SUD.

13. The system of claim 9, wherein the one or more processors are further configured to map the comparison and determination result and the second response data with the transaction message and store a mapping result.

14. The system of claim 13, wherein the one or more processors are further configured to analyze a cause of an error occurring when the test is failed to generate error information, and map the error information with the transaction message, and store a mapping result.

15. The system of claim 13, wherein the mapping and storing is performed based on a predefined mapping rule in the system.

16. The system of claim 10, wherein the one or more processors are further configured to extract a session ID and a processing ID from the second response data according to a predefined rule and register the session ID and the processing ID to be used as mapping information for subsequent transaction messages.

17. The system of claim 9,
wherein the one or more processors are further configured to:
encode the transaction message stored in the memory.

18. A non-transitory computer-readable medium having stored thereon computer-executable instructions, which, when executed by a processor, performs a method, the method comprising:
capturing network packets transmitted through a first communication network between a user system and a transaction processing system,
the network packets including first request data and first response data that are transmitted for a real transaction occurring between the user system and the transaction processing system;
creating a transaction message by merging the first request data from the user system and the first response data from the transaction processing system,
the first response data being generated by the transaction processing system in response to the first request data;
storing the transaction message in a memory;
converting the first request data into second request data conforming to a protocol used in an SUD according to a conversion rule;
transmitting the second request data to the SUD through a second communication network between a validation system and the SUD;
receiving second response data from the SUD through the second communication network, the second response data being generated by the SUD in response to the second request data;
comparing the second response data and the first response data; and
determining whether a test is successful or failed based on a comparison result,
wherein the method further comprises granting a universally unique identifier (UUID) to the transaction message.

* * * * *